US012692583B2

(12) United States Patent
Choi et al.

(10) Patent No.: US 12,692,583 B2
(45) Date of Patent: Jul. 28, 2026

(54) STAINLESS STEEL FOR POLYMER FUEL CELL SEPARATOR AND METHOD OF MANUFACTURING THE STAINLESS STEEL

(71) Applicants:HYUNDAI BNG STEEL CO., LTD., Changwon-si (KR); HYUNDAI STEEL COMPANY, Incheon (KR)

(72) Inventors: Sang Kyu Choi, Changwon-si (KR); Sang Heon Cho, Changwon-si (KR); Jun Hee Lim, Changwon-si (KR); Sung Moon Kim, Changwon-si (KR); Kyung Soo Choi, Daegu (KR); Yeon Soo Jeong, Gunpo-si (KR); Jae Ho Lee, Yongin-si (KR); Hyun Uk Im, Yongin-si (KR)

(73) Assignees: HYUNDAI BNG STEEL CO., LTD., Changwon-si (KR); HYUNDAI STEEL COMPANY, Incheon (KR)

( * ) Notice: Subject to any disclaimer, the term of this patent is extended or adjusted under 35 U.S.C. 154(b) by 899 days.

(21) Appl. No.: 17/624,658

(22) PCT Filed: Dec. 26, 2019

(86) PCT No.: PCT/KR2019/018472
§ 371 (c)(1),
(2) Date: Jan. 4, 2022

(87) PCT Pub. No.: WO2021/125417
PCT Pub. Date: Jun. 24, 2021

(65) Prior Publication Data
US 2022/0275491 A1      Sep. 1, 2022

(30) Foreign Application Priority Data
Dec. 20, 2019    (KR) ........................ 10-2019-0172290

(51) Int. Cl.
| | |
|---|---|
| *C22C 38/38* | (2006.01) |
| *C22C 38/00* | (2006.01) |
| *C22C 38/02* | (2006.01) |
| *C22C 38/20* | (2006.01) |
| *C22C 38/26* | (2006.01) |
| *C22C 38/28* | (2006.01) |
| *H01M 50/403* | (2021.01) |
| *H01M 50/431* | (2021.01) |

(52) U.S. Cl.
CPC ............ *C22C 38/38* (2013.01); *C22C 38/002* (2013.01); *C22C 38/02* (2013.01); *C22C 38/20* (2013.01); *C22C 38/26* (2013.01); *C22C 38/28* (2013.01); *H01M 50/403* (2021.01); *H01M 50/431* (2021.01)

(58) Field of Classification Search
CPC ....... C22C 38/38; C22C 38/002; C22C 38/02; H01M 50/403; H01M 50/431; H01M 2008/1095; H01M 8/021; C23C 22/82; C23C 22/50
See application file for complete search history.

(56) References Cited

U.S. PATENT DOCUMENTS

| | | | | |
|---|---|---|---|---|
| 5,164,016 | A | * 11/1992 | Henriet | ................. C23G 1/088 |
| | | | | 134/41 |
| 7,254,887 | B2 | 8/2007 | Ishigami et al. | |
| 7,674,546 | B2 | 3/2010 | Kim et al. | |
| 8,828,258 | B2 | 9/2014 | Jeon et al. | |
| 9,130,199 | B2 | 9/2015 | Ide et al. | |
| 9,290,845 | B2 | 3/2016 | Kim et al. | |
| 9,587,297 | B2 | 3/2017 | Shii et al. | |
| 9,653,738 | B2 | 5/2017 | Ide et al. | |
| 11,047,029 | B2 | 6/2021 | Kim et al. | |
| 11,085,120 | B2 | 8/2021 | Yano et al. | |
| 11,398,631 | B2 | 7/2022 | Kim et al. | |
| 2005/0089742 | A1 | 4/2005 | Ishigami et al. | |
| 2005/0208360 | A1 | 9/2005 | Kim et al. | |
| 2006/0105218 | A1* | 5/2006 | Ishikawa | ............. H01M 8/0228 |
| | | | | 429/522 |
| 2010/0129697 | A1 | 5/2010 | Jeon et al. | |
| 2011/0294042 | A1 | 12/2011 | Kim et al. | |
| 2012/0276472 | A1 | 11/2012 | Ide et al. | |
| 2013/0074871 | A1* | 3/2013 | Glass | ........................ C25F 1/06 |
| | | | | 134/3 |
| 2013/0302718 | A1 | 11/2013 | Ide et al. | |
| 2013/0316262 | A1 | 11/2013 | Ishii et al. | |
| 2014/0193668 | A1 | 7/2014 | Makiishi et al. | |

(Continued)

FOREIGN PATENT DOCUMENTS

| | | |
|---|---|---|
| CN | 101646807 A | 2/2010 |
| CN | 102272343 A | 12/2011 |

(Continued)

OTHER PUBLICATIONS

Robert M. Hudson, Pickling and Descaling, 1994, ASM International, ASM Handbook vol. 5, pp. 67-78 (Year: 1994).*
Notification of Reasons for Refusal issued on Nov. 18, 2022, for corresponding Japanese Patent Application No. 2021-561904, 4 pages.
Extended European Search Report issued on Dec. 16, 2022, for corresponding European Patent Application No. 19956948.4, 8 pages.
International Search Report issued on Sep. 16, 2020, for corresponding International Patent Application No. PCT/KR2019/018472, along with an English translation (5 pages).

(Continued)

*Primary Examiner* — Jonathan Johnson
(74) *Attorney, Agent, or Firm* — Hauptman Ham, LLP

(57) ABSTRACT

Provided are stainless steel for a polymer fuel cell separator and a method of manufacturing the stainless steel, in which a surface modification technique based on wet processing is applied to a surface of stainless steel used for parts such as an anode and a cathode, etc., of a stack that generates electricity, thereby improving corrosion resistance and electric conductivity, and preventing moisture from being formed.

6 Claims, 7 Drawing Sheets

(56) References Cited

U.S. PATENT DOCUMENTS

| | | | |
|---|---|---|---|
| 2016/0160329 A1 | 6/2016 | Kim et al. | |
| 2019/0013525 A1* | 1/2019 | Kim ........................ | C22C 38/22 |
| 2020/0248332 A1 | 8/2020 | Yano et al. | |
| 2020/0280075 A1 | 9/2020 | Kim et al. | |
| 2020/0340126 A1* | 10/2020 | Yano ........................ | C22C 38/06 |
| 2022/0359888 A1 | 11/2022 | Kim et al. | |

FOREIGN PATENT DOCUMENTS

| | | | | |
|---|---|---|---|---|
| CN | 102471916 A | | 5/2012 | |
| CN | 103154292 A | | 6/2013 | |
| CN | 103314475 A | | 9/2013 | |
| CN | 103361660 A | | 10/2013 | |
| CN | 103717772 A | | 4/2014 | |
| CN | 105018914 A | * | 11/2015 | |
| CN | 108220937 A | * | 6/2018 | |
| CN | 110521042 A | | 11/2019 | |
| EP | 1242651 B1 | * | 2/2009 | ........... C01B 15/037 |
| EP | 3 576 199 A1 | | 12/2019 | |
| JP | 2006-302729 A | | 11/2006 | |
| JP | 2011-149041 A | | 8/2011 | |
| JP | 2013-65562 A | | 4/2013 | |
| JP | 2019-505972 A | | 2/2019 | |
| KR | 10-2004-0062688 A | | 7/2004 | |
| KR | 10-2005-0093421 A | | 9/2005 | |
| KR | 2011121431 A | * | 11/2011 | |
| KR | 10-2012-0073646 A | | 7/2012 | |
| KR | 10-1410483 B1 | | 6/2014 | |
| KR | 1410483 B1 | * | 6/2014 | |
| KR | 10-2015-0074768 A | | 7/2015 | |
| KR | 10-2016-0082632 A | | 7/2016 | |
| KR | 10-2018-0107050 A | | 10/2018 | |
| WO | 2019/082591 A1 | | 5/2019 | |

OTHER PUBLICATIONS

Written Opinion issued on Sep. 16, 2020, for corresponding International Patent Application No. PCT/KR2019/018472 (4 pages).
Office Action issued on Sep. 15, 2022, for corresponding Chinese patent application No. 201980101705.3, (10 pages).

* cited by examiner

COMPARATIVE EXAMPLE 3

COMPARATIVE EXAMPLE 5

EMBODIMENT 3

COMPARATIVE EXAMPLE 1

EMBODIMENT 1

EMBODIMENT 3

STAINLESS STEEL FOR POLYMER FUEL CELL SEPARATOR AND METHOD OF MANUFACTURING THE STAINLESS STEEL

CROSS-REFERENCE TO RELATED APPLICATION

[1] The present application is a national stage filing under 35 U.S.C § 371 of PCT application number PCT/KR2019/018472 filed on Dec. 26, 2019 which is based upon and claims the benefit of priority to Korean Patent Application No. 10-2019-0172290 filed on Dec. 20, 2019, in the Korean Intellectual Property Office, which are incorporated herein in their entireties by reference.

TECHNICAL FIELD

The present disclosure relates to stainless steel for a polymer fuel cell separator used in an electricity generator using a hydrogen fuel, and a method of manufacturing the stainless steel, and more particularly, to stainless steel for a polymer fuel cell separator and a method of manufacturing the stainless steel, in which a surface modification technique based on wet processing is applied to a surface of stainless steel used for an anode, a cathode, etc., of a stack that generates electricity, thus providing corrosion resistance and electrical conductivity and preventing moisture from being formed.

The present disclosure also relates to stainless steel for a polymer fuel cell separator and a method of manufacturing the stainless steel, in which durability is superior with electrical, chemical, and physical stability by using a surface modification technique based on a chemical method instead of a coating method or a passivation processing method.

BACKGROUND ART

A hydrogen fuel cell is an eco-friendly electricity generator that generates water and electrical energy by using hydrogen and oxygen in the atmosphere, reversely to a method of generating hydrogen and oxygen based on water electrolysis with an eco-friendly electric power generation system that has emerged as a scheme to replace a fossil fuel and reduce air pollution. Among fuel cells, especially, a polymer fuel cell (a proton exchange membrane fuel cell: PEMFC) has advantages such as a low operating temperature of 60 to 80° C., a high energy efficiency, etc.

The polymer fuel cell includes a polymer electrolyte membrane, an electrode, a gas diffusion layer (GDL), and a separator. The separator used in the polymer fuel cell has a structure having formed therein a channel through which hydrogen and oxygen may flow, and separates each unit cell, serves as a support of a membrane electrode assembly (MEA), provides a path through which hydrogen and oxygen may flow, and plays an important role as a current collector that delivers generated energy.

In the polymer fuel cell (PEMFC) generating electricity by using a hydrogen fuel, hydrogen supplied from a fuel electrode (an anode) is dissociated into hydrogen ions and electrons while passing through an electrolyte layer, and the hydrogen ions move to an air electrode (a cathode) and react with oxygen to form water, and the electrons move from the electrolyte layer to an electricity storage device (a battery) through an external circuit to form electricity, such that electricity is produced based on an electrochemical reaction between hydrogen and oxygen.

The polymer fuel cell includes a polymer electrolyte membrane, an electrode, a GDL, and a separator. The separator used in the polymer fuel cell has a structure having formed therein a channel through which hydrogen and oxygen may flow, and separates each unit cell, serves as a support of a membrane electrode assembly (MEA), provides a path through which hydrogen and oxygen may flow, and plays an important role of a current collector that delivers generated energy.

A fuel cell separator, which refers to a fuel electrode (an anode) and an air electrode (a cathode), enables an electrochemical reaction between hydrogen and oxygen. Thus, the fuel cell separator requires superior electrical conductivity to facilitate movement of electrons and needs to guarantee corrosion resistance to prevent corrosion in a reaction between the anode and the cathode. To prevent moisture condensation (a flooding phenomenon) by lowering a surface tension for smoothly discharging water generated by an electrochemical reaction between hydrogen and oxygen, excellent hydrophilicity is required.

The fuel cell separator requires superior thermal and electrical conductivity, a mechanical strength for preventing deformation and avoiding destruction due to vibration or shocks, dimensional stability, chemical resistance, etc., and graphite, a Ti alloy, conductive plastic, stainless steel, etc., have such properties, and as a metal electrode plate, stainless steel is used for excellent thermal conductivity, formability, dimensional stability, and corrosion resistance, and conductivity is given to the electrode plate by coating the electrode plate or forming a conductive film on the electrode plate.

A carbon (or graphite)-based separator has a high gas or liquid permeability and poor mechanical strength and moldability, and has a high processing cost. On the other hand, a stainless metal separator has superior gas tightness and high thermal and electrical conductivity, and is able to be thinned, guaranteeing lightweightness and excellent shock resistance. Moreover, the stainless metal separator has the advantage of reducing the price of the separator with excellent production yield in application of a thin plate forming process such as stamping, hydroforming, etc.

With this advantage, a demand for using stainless steel as a polymer fuel cell separator has been increasing recently. Stainless steel has an excellent thinning property and formability, but has a high contact resistance due to a $Cr_2O_3$ passivation film formed on a surface of the stainless steel, resulting in low electrical conductivity.

To solve this problem, after a separator is manufactured by forming a flow path in stainless steel, a conductive material, such as Au, Pt, C, etc., is coated onto a surface of the fuel cell separator to give conductivity in a final process, thereby improving electrical conductivity.

However, a process of coating the conductive material such as Au, Pt, C, etc., occupies a high proportion of a manufacturing cost of the fuel cell separator, such that this issue needs to be solved to improve production cost and yield.

Stainless steel is made of an alloy including iron and chromium or including iron, chromium, and nickel, and the corrosion resistance of the stainless steel may be excellent by forming a very thin chrome oxide layer ($Cr_2O_3$) in which chromium (Cr) is combined with the surface of the steel to block intrusion of oxygen into a metal matrix. As the chrome oxide layer ($Cr_2O_3$) formed on the surface of stainless steel is formed firmly, corrosion resistance may be superior, but as the firm oxide layer is formed, electrical conductivity may be degraded.

With such properties, for the separator, a method of coating or carbon coating using gold or white gold, which is precious metal with excellent corrosion resistance and electrical conductivity, and a method of forming a conductive film after stainless passivation are applied.

A related prior document, Korean Patent Publication Gazette No. 10-2015-0074768 (published on Jul. 2, 2015) discloses austenite-based stainless steel for a fuel cell and a method of manufacturing the stainless steel.

DETAILED DESCRIPTION OF INVENTION

Technical Problem

The present disclosure provides stainless steel for a polymer fuel cell separator and a method of manufacturing the stainless steel, in which a chemical surface modification technique, instead of coating or conductive film formation, is applied to simultaneously implement corrosion resistance and electrical conductivity that are mechanical properties for use as a fuel cell separator, thereby securing a superior interfacial contact resistance.

The present disclosure also provides stainless steel for a polymer fuel cell separator and a method of manufacturing the stainless steel, in which a thermal oxide film generated in a steel making and rolling process or a natural oxide film formed in an atmosphere environment are removed by etching and a chemical surface modification technique is applied, such that the stainless steel has a contact resistance of 10 to 35 m$\Omega$·cm$^2$ under a pressure of 1.0 MPa, and has a contact angle of 30° ~ 70° in a contact angle (water droplet formation) test to provide a high-temperature potentiodynamic corrosion resistance of 15 $\mu$A/cm$^2$ or less and remove moisture condensation in a mixed solution of sulfuric acid of 0.1 N and hydrofluoric acid of 2 ppm at a temperature of 80° C. that is a polymer fuel cell environment temperature.

Solution to Problem

According to an aspect of the present disclosure, stainless steel for a polymer fuel cell separator includes, by weight %, C: 0.01~ 0.08%, Si: 0.3~ 1.0%, Mn: 0.3~ 2.0%, Cr: 15~ 35%, Cu: 1.0% or less, N: 0.01~ 0.05%, Ti: 0.3% or less, Nb: 0.3% or less, Fe and other inevitable impurities, and a surface modification layer having an interfacial contact resistance of 10~ 35 m$\Omega$·cm$^2$ through surface modification processing, in which a potentiodynamic corrosion resistance is 1.0~ 15.0 $\mu$A/cm$^2$ and a contact angle is 30~ 70°.

The stainless steel may further include one or more kinds of P: 0.14 weight % or less, S: 0.03 weight % or less, H: 0.004 weight % or less, and 0:0.007 weight % or less.

The surface modification processing may include degreasing processing of performing immersion in a degreasing solution, etching and desmut processing of performing etching with an etching solution and desmut processing in a desmut solution, and surface stabilization processing of performing immersion in a surface stabilization solution.

According to another aspect of the present disclosure, a method of manufacturing stainless steel for a polymer fuel cell separator includes, (a) providing a stainless base material including, by weight %, C: 0.01~ 0.08%, Si: 0.3~ 1.0%, Mn: 0.3~ 2.0%, Cr: 15~ 35%, Cu: 1.0% or less, N: 0.01~ 0.05%, Ti: 0.3% or less, Nb: 0.3% or less, and as the rest, Fe and other inevitable impurities, the stainless base material having a passivation film formed on a surface thereof, (b)

performing degreasing processing by immersing the surface of the stainless base material in a degreasing solution, (c) after etching the degreasing-processed stainless base material with an etching solution, performing desmut processing with a desmut solution, and (d) performing surface stabilization on the etched and desmut-processed stainless base material with a surface stabilization solution, in which after (d), the stainless steel includes a surface modification layer having an interfacial contact resistance of 10~ 35 m$\Omega$·cm$^2$, through surface modification processing.

The stainless base material may further include one or more kinds of P: 0.14 weight % or less, S: 0.03 weight % or less, H: 0.004 weight % or less, and 0:0.007 weight % or less.

In (b), the degreasing processing may include performing immersion in the degreasing solution at 30~ 70° C. for 0.5~ 5 minutes.

In (c), the etching processing may include performing immersion for 0.2~ 2 minutes in an etching solution, heated to 40~ 80° C., including at least two or more of 2.5~ 6.2 mol/L of sulfate ions, 0.1~ 2.0 mol/L of nitrate ions, and 1.0~ 5.0 mol/L of fluoride, and the desmut processing may include performing immersion for 0.5~ 2 minutes in a desmut solution, heated to 40~ 80° C., including 1.5~ 6.0 mol/L of hydrogen peroxide, 1.0~ 4.0 mol/L of fluoride, and 0.001~ 0.01 mol/L of a corrosion inhibitor.

After (d), the method may further include (e) performing stabilization thermal processing for stabilization of the surface-stabilized stainless base material.

The stabilization thermal processing may be performed at 150~ 250° C. for 1~ 10 minutes.

Advantageous Effects of Invention

Stainless steel for a polymer fuel cell separator and a method of manufacturing the stainless steel according to the present disclosure modify a surface passivation film without corrosion or pitting with respect to a stainless base material having a passivation film on a surface thereof, thereby securing a low interfacial contact resistance, superior corrosion resistance, and excellent wettability.

Moreover, the stainless steel for a polymer fuel cell separator and the method of manufacturing the stainless steel according to the present disclosure may provide a superior interfacial contact resistance and corrosion resistance without additional coating of precious metal or conductive materials, and provide excellent surface wettability without further hydrophilic processing or coating.

BRIEF DESCRIPTION OF DRAWINGS

FIG. 5 shows pictures of contact angles of samples manufactured according to Comparative Examples 1 through 3 and 5.

FIG. 6 shows pictures of contact angles of samples manufactured according to Embodiments 1 through 4.

BEST MODE FOR CARRYING OUT THE INVENTION

Figure 1:
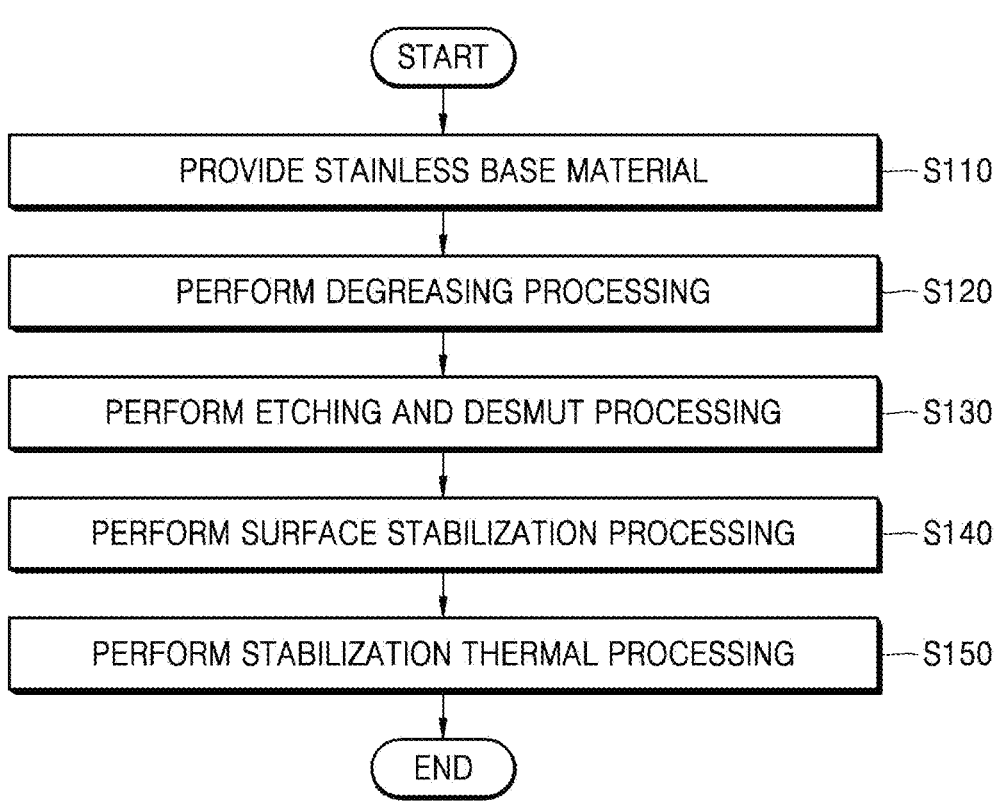
FIG. 1 is a flowchart illustrating a method of manufacturing stainless steel for a polymer fuel cell separator, according to an embodiment of the present disclosure.

Advantages and features of the present disclosure and a method for achieving them will be apparent with reference to embodiments described in detail, together with the attached drawings. However, the present disclosure is not limited to the disclosed embodiments, but may be implemented in various manners, the embodiments are provided to complete the disclosure of the present disclosure and to allow those of ordinary skill in the art to understand the category of the present disclosure, and the present disclosure is defined by the category of the claims. Throughout the specification, an identical reference numeral will indicate an identical component.

Hereinafter, with reference to the accompanying drawings, stainless steel for a polymer fuel cell separator and a method of manufacturing the stainless steel according to an embodiment of the present disclosure will be described in detail.

Stainless steel for a polymer fuel cell separator according to an embodiment of the present disclosure may include, by weight %, C: 0.01~ 0.08%, Si: 0.3~ 1.0%, Mn: 0.3~ 2.0%, Cr: 15~ 35%, Cu: 1.0% or less, N: 0.01~ 0.05%, Ti: 0.3% or less, Nb: 0.3% or less, and as the rest, Fe and other inevitable impurities, and may include a surface modification layer having an interfacial contact resistance of 10~ 35 $m\Omega \cdot cm^2$ under a pressure of 1.0 MPa through surface modification processing.

The stainless steel for the polymer fuel cell separator according to an embodiment of the present disclosure may further include one or more kinds of P: 0.14 weights or less, S: 0.03 weight % or less, H: 0.004 weight % or less, and 0:0.007 weight: or less.

As a result, the stainless steel for the polymer fuel cell separator according to an embodiment of the present disclosure may have a potentiodynamic corrosion resistance of 15 $\mu A/cm^2$ or less (sulfuric acid of 0.1 N and hydrofluoric acid of 2 ppm at 80° C., SCE), more preferably, 1.0~ 15.0 $\mu A/cm^2$, and a contact angle of 70° or less, more preferably, a contact angle range of 30° ~ 70°, when a droplet of 3 $\mu l$ is dropped.

Hereinbelow, a role and a content of each component included in the stainless steel for the polymer fuel cell separator according to an embodiment of the present disclosure will be described.

Carbon (C)

Carbon (C) is an essential element for increasing the strength of austenitic stainless steel, and may be preferably added at a content ratio of 0.01~ 0.08 weights to a total weight. When the amount of addition of carbon (C) is less than 0.01 weight %, a refining price for making a high-purity product may increase. In contrast, when the amount of addition of carbon (C) exceeds 0.08 weight %, processability and toughness may be degraded due to increase of impurities.

Silicon (Si)

Silicon (Si) is an effective element for deoxidation, and may be preferably added at a content ratio of 0.3~ 1.0 weight % to a total weight. When the amount of addition of silicon (Si) is less than 0.3 weight %, a refining price may be increased. On the other hand, when the amount of addition of silicon (Si) exceeds 1.0 weight %, a material may be hardened, degrading toughness and thus formability.

Manganese (Mn)

Manganese (Mn) is an essential element for increasing austenitic phase stability, and may be preferably added at a content ratio of 0.3~ 2.0 weights to a total weight. When the amount of addition of manganese (Mn) is less than 0.3 weights, a target physical property may be difficult to secure. In contrast, when the amount of addition of manganese (Mn) exceeds 2.0 weight %, corrosion resistance may be degraded due to excessive addition of manganese (Mn).

Chromium (Cr)

Chromium (Cr) is an essential element for improving corrosion resistance and oxidation resistance in an operating environment of a fuel cell, and may be preferably added at a content ratio of 15~ 35 weight % to a total weight. When the amount of addition of chromium (Cr) is less than 15 weight %, it is difficult to secure proper oxidation resistance in the operating environment of the fuel cell. In contrast, when the amount of addition of chromium (Cr) exceeds 35 weights, a manufacturing may be increased and toughness may be degraded, due to addition more than necessary.

Copper (Cu)

Copper (Cu) is an economical additive element that may substitute for expensive molybdenum (Mo) to increase pitting resistance in an acidic atmosphere where the fuel cell operates. However, when Cu is excessively added, the performance of the fuel cell may be degraded due to elution of Cu, and thus in consideration of this, in the present disclosure, Cu is limited to 1.0 weights or less to the total weight of the stainless steel.

Nitrogen (N)

Nitrogen (N), which is an element for forming a nitride, exists interstitially, such that when N is contained excessively, it may be an unfavorable to elongation rate and yield point elongation in spite of increase of strength. Thus, in the present disclosure, nitrogen may be preferably limited to a content ratio of 0.01~ 0.05 weight % to the total weight of the stainless steel.

Titanium (Ti)

Titanium (Ti) is an effective element for forming C and N of the steel into a carbonitride, but may degrade toughness when added excessively. Thus, in the present disclosure, in consideration of this, Ti is limited to 0.3 weight % or less to the total weight of the stainless steel.

Niobium (Nb)

Niobium (Nb), like titanium, is an effective element for forming C and N of the steel into a carbonitride, but may degrade toughness when added excessively. Thus, in the present disclosure, in consideration of this, Ti is limited to 0.3 weight % or less to the total weight of the stainless steel.

Phosphorus (P), Sulfur (S)

Phosphorus (P) reduces toughness as well as corrosion resistance, and thus in the present disclosure, is limited to 0.14 weight % or less to the total weight of the stainless steel.

Sulfur (S) may form manganese sulfide (MnS) that becomes a starting point of corrosion and thus reduces corrosion resistance, and thus in the present disclosure, in consideration of this, S is limited to 0.03 weights to the total weight of the stainless steel.

Hydrogen (H), Oxygen (O)

Hydrogen (H) and oxygen (O), which are inevitably added impurities, may be preferably limited strictly to 0.004 weight % or less and 0.007 weight % or less, respectively, to the total weight of the stainless steel of the present disclosure.

Hereinafter, with reference to the accompanying drawings, a method of manufacturing the stainless steel for the polymer fuel cell separator according to an embodiment of the present disclosure will be described.

FIG. 1 is a flowchart illustrating a method of manufacturing stainless steel for a polymer fuel cell separator, according to an embodiment of the present disclosure.

As illustrated in FIG. 1, a method of manufacturing stainless steel for a polymer fuel cell separator, according to an embodiment of the present disclosure, may include stainless base material providing operation S110, degreasing processing operation S120, etching and desmut processing operation S130, and surface stabilization processing operation S140. The method of manufacturing stainless steel for a polymer fuel cell separator according to an embodiment of the present disclosure may further include stabilization thermal-processing operation S150. The stabilization thermal-processing operation S150 may not be necessarily performed and may be omitted depending on needs.

Provide Stainless Base Material

In operation S110 of providing the stainless base material, the stainless base material is provided which includes, by weight %, C: 0.01~ 0.08%, Si: 0.3~ 1.0%, Mn: 0.3~ 2.0%, Cr: 15~ 35%, Cu: 1.0% or less, N: 0.01~ 0.05%, Ti: 0.3% or less, Nb: 0.3% or less, and as the reset, Fe and other inevitable impurities, and has a passivation film formed on a surface thereof.

The stainless base material may further include one or more kinds of P: 0.14 weight % or less, S: 0.03 weight % or less, H: 0.004 weight % or less, and 0:0.007 weight % or less.

In this case, the passivation film may cover the surface of the stainless base material. The passivation film may include $Cr_2O_3$. The passivation film may be formed on a top surface or a bottom surface of the stainless base material or both the top surface and the bottom surface.

In this case, the stainless base material has an excellent thinning property and formability, but has a high electrical resistance due to the $Cr_2O_3$ passivation film formed on the surface thereof, resulting in low electrical conductivity.

Generally, the stainless base material may have, but not limited to, a thickness of 0.05~ 10 mm. The stainless base material may have a high contact resistance of 200~ 500 $m\Omega \cdot cm^2$ under a pressure of 1.0 MPa due to the $Cr_2O_3$ passivation film generated on the surface thereof. Therefore, to use the stainless base material as the fuel cell separator, low contact resistance needs to be secured.

Degreasing Processing

In degreasing processing operation S120, the surface of the stainless base material may be degreased by being immersed in a degreasing solution.

Herein, the degreasing processing may be performed to remove an organic matter such as the $Cr_2O_3$ passivation film attached onto the surface of the stainless base material, etc. There is no significant distinction between an acidic solution, a neutral solution, or an alkaline solution in the degreasing processing, and any solution capable of removing an organic matter adsorbed in the rolling process of the stainless base material may be used limitlessly.

More preferably, the degreasing solution may include 0.1~ 3 mol/L of one or more kinds of sodium hydroxide and potassium hydroxide, 0.01~ 2 mol/L of silicate, 0.005~ 0.8 mol/L of phosphate, 0.02~ 3 mol/L of carbonate, a surfactant, and an emulsifier.

In this operation, the degreasing processing may preferably include immersion processing in the degreasing solution at 30~ 70° C. for 0.5~ 5 minutes. When a degreasing processing temperature is lower than 30° C. or a degreasing processing time is shorter than 0.5 minute, there is a high risk of failing to completely remove the organic matter existing on the surface of the stainless base material. On the other hand, when the degreasing processing temperature is higher than 70° C. or the degreasing processing time is longer than 5 minutes, the degreasing processing may become a factor that increases a manufacturing cost without further effect increase, resulting in diseconomy.

Etching and Desmut Processing

In etching and desmut processing operation S130, after the degreasing-processed stainless base material is etched with an etching solution, desmut processing may be performed with a desmut solution.

When etching processing is applied to remove heat and a natural oxide film existing on the surface of the stainless base material, a smut that is a corrosion product may be generated excessively, and in this case, stains and discoloration may occur in the exterior, adversely affecting a contact resistance, corrosion resistance, and a contact angle. Thus, etching processing needs to be accompanied by desmut processing.

Due to the heat and the natural oxide film existing on the surface of the stainless base material, the interfacial contact resistance is equal to or greater than 300 $m\Omega \cdot cm^2$ under a pressure of 1.0 MPa, and the contact angle is 75° ~ 100° with a hydrophobic property.

In this operation, etching processing may preferably include immersion for 0.2~ 2 minutes in an etching solution, heated to 40~ 80° C., including at least two or more of 2.5~ 6.2 mol/L of sulfate ions, 0.1~ 2.0 mol/L of nitrate ions, and 1.0~ 5.0 mol/L of fluoride.

Desmut processing may preferably include immersion for 0.5~ 2 minutes in a desmut solution, heated to 40~ 80° C., including 1.5~ 6.0 mol/L of hydrogen peroxide, 1.0~ 4.0 mol/L of fluoride, and 0.001~ 0.01 mol/L of a corrosion inhibitor. Herein, as the corrosion inhibitor, benzotriazole may be used, without being limited thereto.

In this operation, when a thickness of 0.2~ 5 μm is etched, an oxide film existing on the surface of the stainless base material may be completely removed and a hydrophilic property of a contact angle of 30° ~ 70° and a contact resistance of 10~ 35 $m\Omega \cdot cm^2$ may be given. At a high concentration and a high temperature of about 80° C., more etching may be made; at a low concertation or a low temperature, the oxide film may not be removed, such that the contact resistance may exceed 30 $m\Omega \cdot cm^2$.

As such, when an excessive reaction occurs due to a processing condition, a thickness of a product may significantly decrease due to an excessive etching amount, failing to have characteristics as the fuel cell separator.

Surface Stabilization Processing

In surface stabilization processing operation S140, the etched and desmut-processed stainless base material is subject to surface stabilization processing with a surface stabilization solution.

The surface stabilization processing may be performed by immersing the etched and desmut-processed stainless base material at 50~ 80° C. for 0.5~5 minutes, in the surface stabilization solution including 2.7~13.8 mol/L of nitrate, 0.05~ 0.5 mol/L of sulfate, a surfactant, and a stabilizer. Generally, in the case of well-known passivation processing, the oxide film may be densely formed, improving corrosion resistance, but increasing a contact resistance, and when the oxide film is thin and porous, corrosion resistance may become weak in spite of a low contact resistance.

On the other hand, when the surface stabilization processing is performed like in the present disclosure, a surface modification layer of a thickness of several~several tens of nanometers (nm) may be formed on the surface of the stainless base material, thereby giving superior corrosion resistance while maintaining a low contact resistance.

Through such surface stabilization processing, i.e., surface modification processing, stainless steel according to the present disclosure may have a surface modification layer having an interfacial contact resistance of 10~ 35 mΩ·cm² under a pressure of 1.0 MPa.

Stabilization Thermal Processing

In stabilization thermal processing operation S150, stabilization thermal processing may be performed to stabilize the surface-stabilized stainless base material.

Such stabilization thermal processing may be carried out to remove moisture remaining on the surface of the stainless base material after the surface stabilization processing and promote stabilization of the surface modification layer.

To this end, the stabilization thermal processing may be preferably performed for 1~10 minutes in an atmospheric condition of 150~ 250° C. The surface modification layer formed by wet surface processing has a shelf life due to a continuous reaction with oxygen in the atmospheric environment, and to reduce surface property change with the shelf life in the formation of the oxide layer, the activated surface modification layer is stabilized by thermal processing. Thus, at an environment temperature of 80° C. required in the fuel cell, a high-temperature potentiodynamic corrosion resistance of 15 μA/cm² (SCE) or less may be guaranteed.

The surface of the stainless steel for the polymer fuel cell separator manufactured through the foregoing process (S110 through S150) is modified by reconstructing the passivation film through surface modification processing, thereby securing superior interfacial contact resistance without being coated with a conductive material.

As such, in the present disclosure, by performing modification processing of removing and reconstructing the passivation film on the surface of the stainless base material, a low interfacial contact resistance, superior potentiodynamic corrosion resistance, and excellent surface wettability for use as the fuel cell separator may be guaranteed.

As a result, the stainless steel for the polymer fuel cell separator according to an embodiment of the present disclosure has an interfacial contact resistance of 35 mΩ·cm² or less under a pressure of 1.0 MPa without coating with a conductive material, thereby satisfying properties required for the polymer fuel cell separator.

EMBODIMENT

Hereinbelow, the structure and action of the present disclosure will be described in more detail with reference to an embodiment of the present disclosure. However, this will be provided as a preferred example of the present disclosure, and is not interpreted as limiting the present disclosure in any sense.

A matter not described herein may be sufficiently technically construed by those of ordinary skill in the art and thus will not be described.

1. Manufacture Sample

Comparative Example 1

A stainless base material including, by weight %, C: 0.05%, Si: 0.6%, Mn: 1.1%, Cr: 21%, Cu: 0.4%, N: 0.03%, Ti: 0.2%, Nb: 0.1%, and Fe as the rest, and having a passivation film formed thereon is provided, and is measured without separate surface processing after alkaline degreasing.

Comparative Example 2

Au is coated on the stainless base material manufactured according to Comparative Example 1 to a thickness of 1 μm to manufacture a sample.

Comparative Example 3

Surface modification of immersing the stainless base material manufactured according to Comparative Example 1 in a complex mixed solution, heated to 30° C., of 4.7 mol/L of sulfuric acid, 1.1 mol/L of nitric acid, and 2.1 mol/L of fluoride (F—) for 60 secs is performed to manufacture a sample.

Comparative Example 4

After etching of immersing the stainless base material manufactured according to Comparative Example 1 in a complex mixed solution, heated to 30° C., of 4.7 mol/L of sulfuric acid, 1.1 mol/L of nitric acid, and 2.1 mol/L of fluoride (F—), for 60 secs, desmut processing of immersion in a mixed solution, heated to 30° C., of 3.4 mol/L of hydrogen peroxide and 2.1 mol/L of fluoride (F—) for 60 secs is performed to manufacture a sample.

Comparative Example 5

Except for immersion at an etching temperature of 60° C., a sample is manufactured in the same manner as in Comparative Example 4.

Comparative Example 6

After etching of immersing the stainless base material manufactured according to Comparative Example 1 in a complex mixed solution, heated to 60° C., of 2.5 mol/L of sulfuric acid and 4.1 mol/L of fluoride (F—), for 60 secs, desmut processing of immersion in a mixed solution, heated to 60° C., of 3.4 mol/L of hydrogen peroxide and 2.1 mol/L of fluoride (F—) for 60 secs is performed to manufacture a sample.

Comparative Example 7

After the same processing as Comparative Example 6, immersion in a mixed solution, heated to 60° C., of 0.5 mol/L of sulfuric acid and 10.4 mol/L of nitric acid for 100 secs is performed to manufacture a sample.

Comparative Example 8

Except for immersion in a complex mixed solution, heated to 60° C., of 4.7 mol/L of sulfuric acid, 1.1 mol/L of nitric acid, and 2.1 mol/L of fluoride (F—), for 150 secs, a sample is manufactured in the same process as Comparative Example 7 after etching.

Comparative Example 9

Except for immersion in a complex mixed solution, heated to 60° C., of 6.2 mol/L of sulfuric acid, 1.1 mol/L of nitric acid, and 2.1 mol/L of fluoride (F—), for 150 secs, a sample is manufactured in the same process as Comparative Example 7 after etching.

Embodiment 1

A stainless base material including, by weight %, C: 0.05%, Si: 0.6%, Mn: 1.1%, Cr: 21%, Cu: 0.4%, N: 0.03%, Ti: 0.2%, Nb: 0.1%, and as the rest, Fe, and having a passivation film formed thereon is provided and alkaline degreasing is performed to remove an organic matter from the surface.

Next, after etching is performed for 60 secs through immersion in a complex mixed solution, heated to 60° C., of 4.7 mol/L of sulfuric acid, 1.1 mol/L of nitric acid, and 2.1 mol/L of fluoride (F—), desmutting is performed for 60 secs in a mixed solution, heated to 60° C., of 3.4 mol/L of hydrogen peroxide and 2.1 mol/L of fluoride (F—), after which immersion in a mixed solution, heated to 60° C., of 0.5 mol/L sulfuric acid and 11.4 mol/L nitric acid for 100 secs is performed to manufacture a sample.

Embodiment 2

A sample manufactured in the same manner as Embodiment 1 undergoes stabilization thermal processing at a temperature of 100° C. for 600 secs to manufacture a sample.

Embodiment 3

A sample manufactured in the same manner as Embodiment 1 undergoes stabilization thermal processing at a temperature of 200° C. for 120 secs to manufacture a sample.

Embodiment 4

A sample manufactured in the same manner as Embodiment 1 is subject to stabilization thermal processing at a temperature of 200° C. for 300 secs to manufacture a sample.

Embodiment 5

Except for immersion in a complex mixed solution, heated to 60° C., of 6.2 mol/L of sulfuric acid, 1.1 mol/L of nitric acid, and 2.1 mol/L of fluoride (F—) and etching for 60 secs in the etching process, a sample is manufactured in the same manner as Embodiment 1.

Embodiment 6

A sample manufactured in the same manner as Embodiment 5 is subject to stabilization thermal processing for 120 secs at 200° C. to manufacture a sample.

2. Evaluation of Physical Properties

Table 1 shows processing conditions for manufacturing samples according to Embodiments 1 through 6 and Comparative Examples 1 through 9, and Table 2 shows physical property evaluation results of the samples manufactured according to Embodiments 1 through 6 and Comparative Examples 1 through 9.

Figure 2:
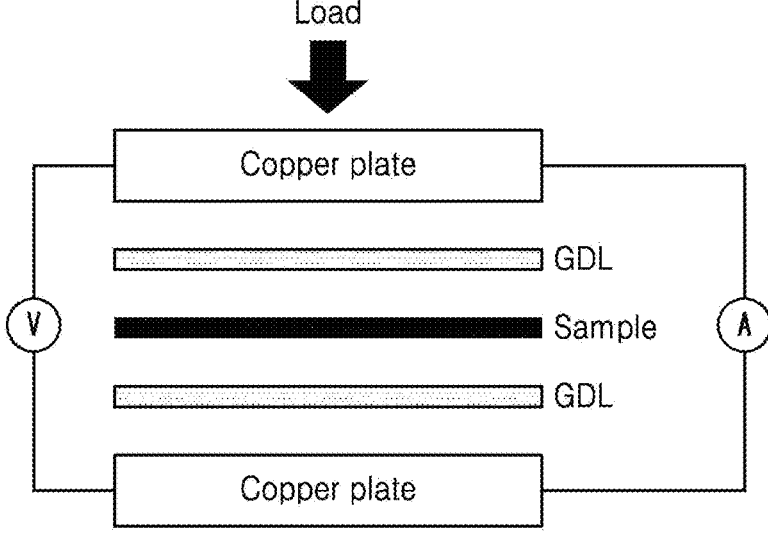
FIG. 2 is a schematic diagram for describing a process of measuring interfacial contact resistances of samples according to Embodiments 1 through 6 and Comparative Examples 1 through 9.

FIG. 2 is a schematic diagram for describing a process of measuring interfacial contact resistances of the samples according to Embodiments 1 through 6 and Comparative Examples 1 through 9.

Figure 3:
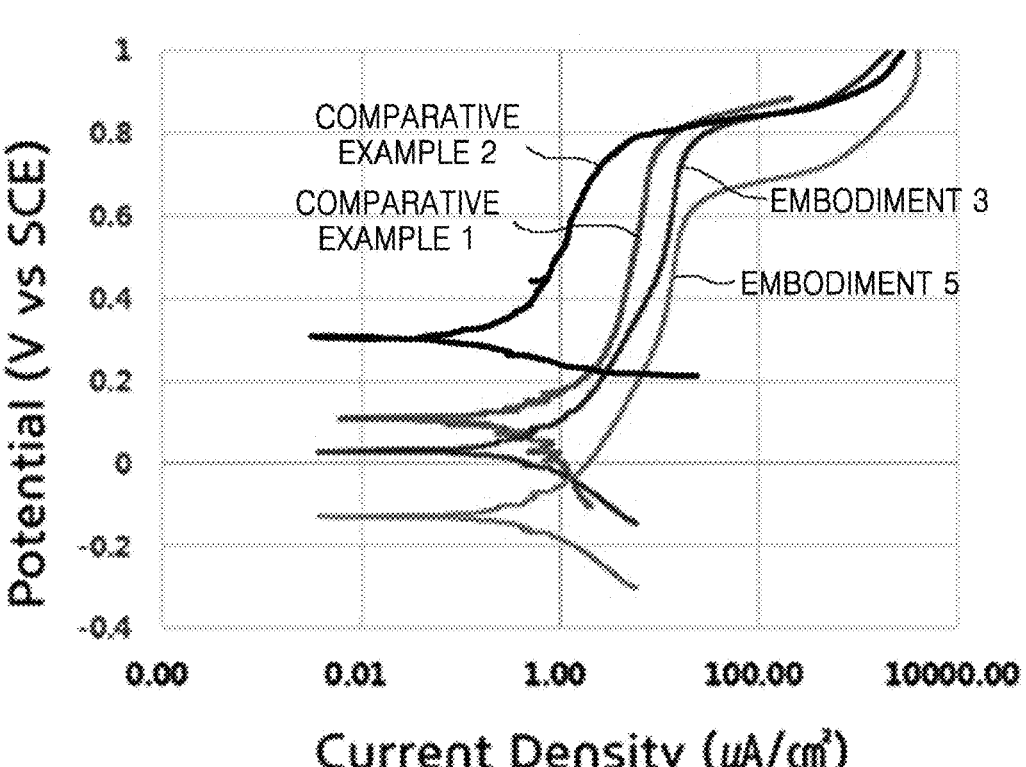
FIG. 3 is a graph showing potentiodynamic corrosion resistance measurement results with respect to samples manufactured according to Comparative Examples 1 through 3 and 5.
Figure 4:
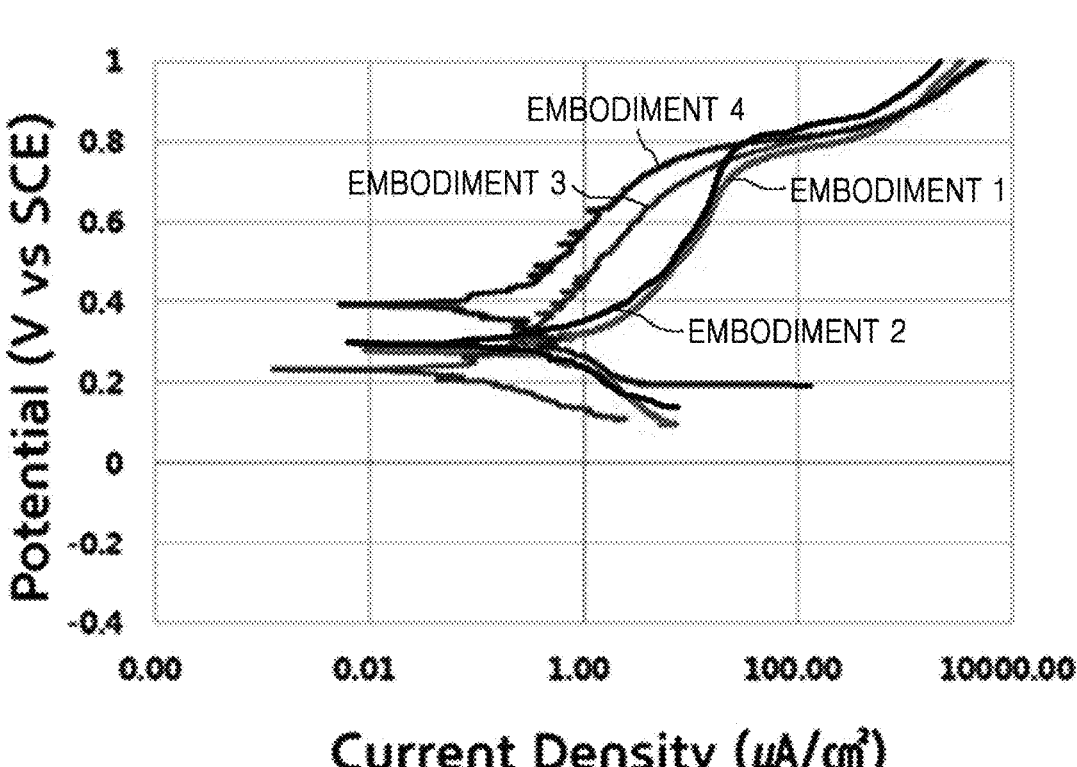
FIG. 4 is a graph showing potentiodynamic corrosion resistance measurement results with respect to samples manufactured according to Embodiments 1 through 4.

FIG. 3 is a graph showing potentiodynamic corrosion resistance measurement results of the samples manufactured according to Comparative Examples 1 through 3 and 5, and FIG. 4 is a graph showing potentiodynamic corrosion resistance measurement results of the samples manufactured according to Embodiments 1 through 4.

Figures 5, 6:
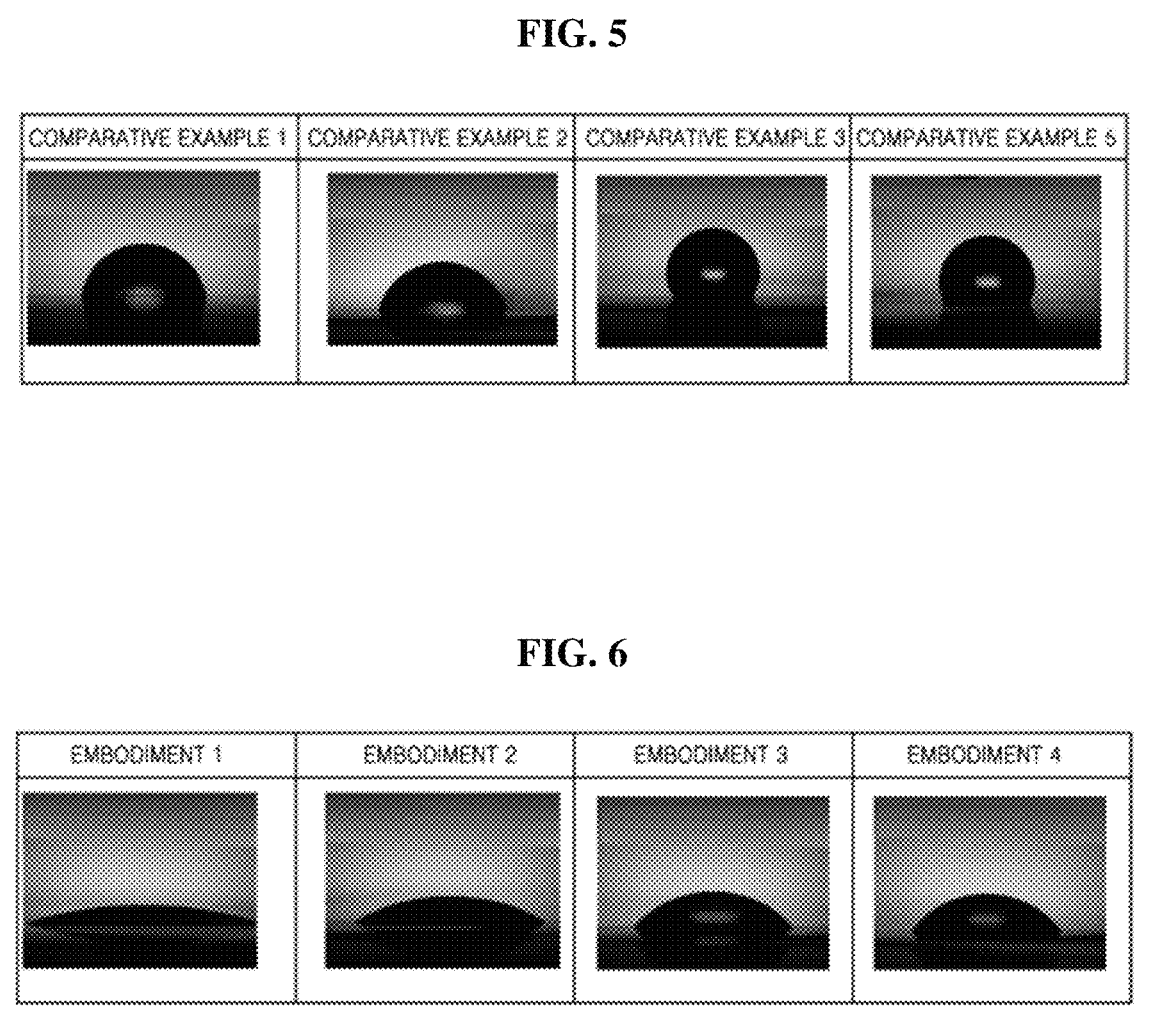

FIG. 5 shows pictures of contact angles of the samples manufactured according to Comparative Examples 1 through 3 and 5, and FIG. 6 shows pictures of contact angles of the samples manufactured according to Embodiments 1 through 4.

Figure 7:
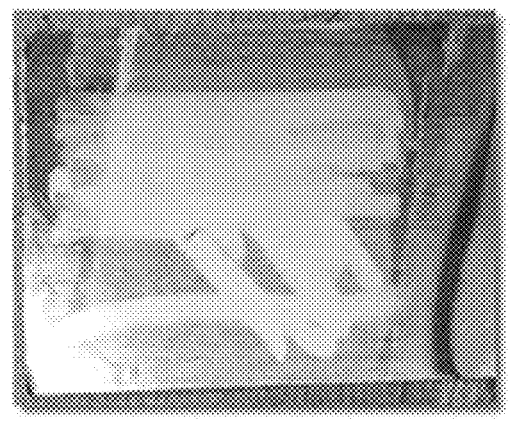
FIG. 7 shows pictures indicating whether a corrosion product (smut) remains for samples manufactured according to Embodiments 3 and 5 and Comparative Example 3.
Figure 7:
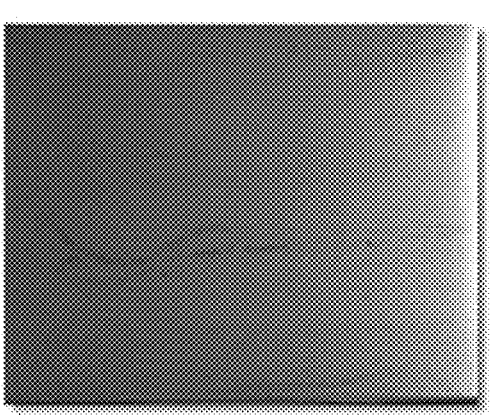
Figure 7:
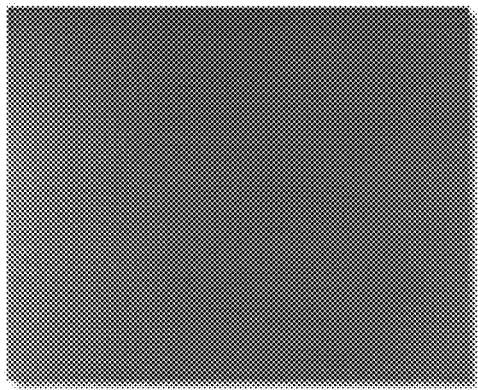

FIG. 7 shows pictures indicating whether a corrosion product (smut) remains for samples manufactured according to Embodiments 3 and 5 and Comparative Example 3.

Figure 8:
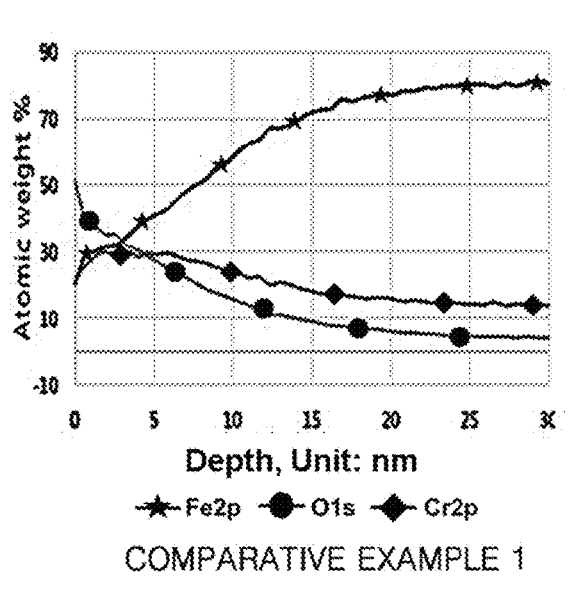
FIG. 8 is a graph showing X-ray photoelectron spectroscopy (XPS) analysis results with respect to samples manufactured according to Embodiments 1 and 3 and Comparative Example 1.
Figure 8:
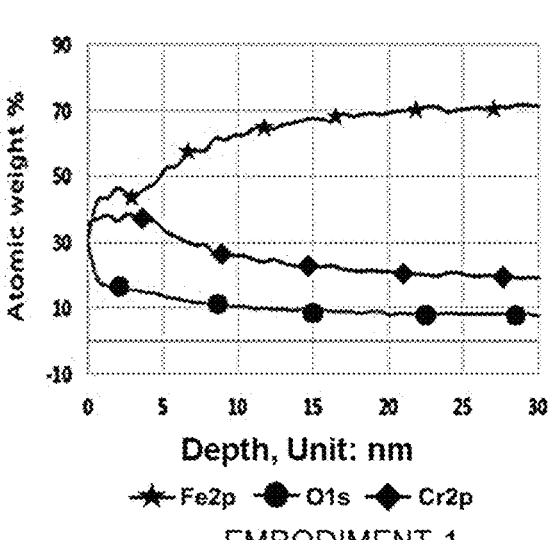
Figure 8:
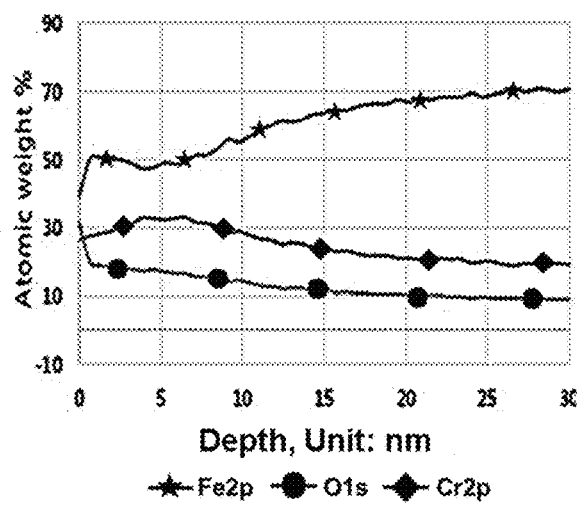
Figure 9:
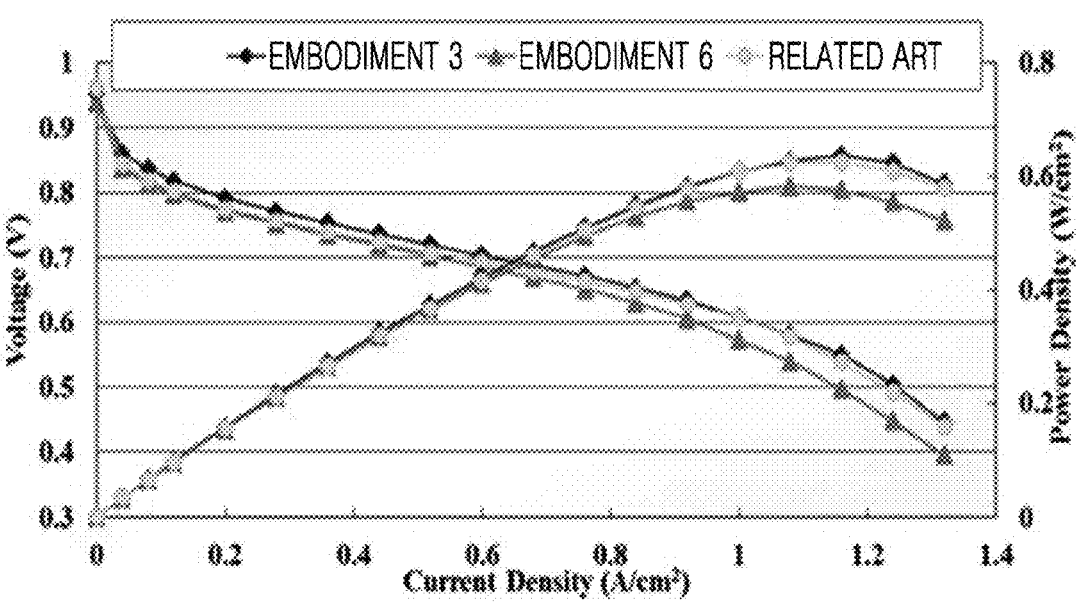
FIG. 9 is a graph showing stack performance measurement results with respect to a unit cell using samples manufactured according to Embodiments 3 and 6 and Comparative Example 2.

FIG. 8 is a graph showing XPS analysis results of the samples manufactured according to Embodiments 1 and 3 and Comparative Example 1, and FIG. 9 is a graph showing results of evaluating stack performance of unit cells using the samples manufactured according to Embodiments 3 and 6 and Comparative Example 2.

1) Surface Cleanliness

Surface cleanliness is observed by naked eyes, and in the case of discoloration due to residual corrosion products on the surface and emergence of foreign substances when wiped with a cotton swab, etc., such presence is indicated by X, and absence is indicated by O.

2) Pitting Stability

As a criterion for evaluating official stability, presence of pitting of 1 μm or more after surface modification is indicated by X and absence of pitting and erosion on the surface is indicated by O. Herein, when erosion and pitting occur on a stainless steel sample after surface modification, corrosion resistance may be degraded in a fuel cell operating environment, such that whether erosion and pitting occur after surface modification is important.

3) Interfacial Contact Resistance

As shown in FIG. 2, by using a method of measuring current under a pressure of 1.0 MPa after insertion of stainless steel (sample) between gas diffusion layers (GDLs), a contact resistance after surface modification is measured.

4) Corrosion Current

For corrosion current, Tafel slope evaluation of a potentiostat is used, and corrosion current upon application of a voltage of 0.6V is measured by performing potentiodynamic evaluation in a mixed solution, heated to 80° C., of 0.1 N of sulfuric acid and 2 ppm of hydrofluoric acid.

5) Contact Angle

For a contact angle, equipment of a model DM700 of Japan's KYOWA company is used, and the contact angle is measured after distilled water of 3 μl is dropped on the surfaces of the samples. Herein, when the contact angle on the surface of the stainless steel is high after surface modification, water discharge is reduced due to the flooding phenomenon caused by water condensed on the surface of the separator under the fuel cell operating environment, such that the non-uniform flow of the reactive gas and degradation of diffusion of the reactive gas cause a deficiency of the reactive gas in the electrode, deteriorating the performance of the fuel cell, and therefore, it is important to implement a hydrophilic surface having a low contact angle.

6) Thickness Reduction

For thickness reduction after surface modification, a thickness of a sample is measured before and after surface modification by using a micrometer. When a thickness of a material is reduced due to an excessive etching reaction, an engaging pressure of about 1000 stacked separators or more is lowered, degrading the performance of a fuel cell, such that it is important to implement stable surface modification without thickness reduction.

7) Stack Evaluation

For separator performance evaluation, separator/GDL/ MEA/GDL/separator are stacked in that order to form a unit cell. As the separator, the related art and Embodiments 3 and 6 are used, and performance comparison is performed in the same cell.

TABLE 1

| Category | Etching | | | | | Desmut | | | | Surface Stabilization | | | | Stabilization Thermal Processing | |
| | sulfuric acid (mol/L) | nitrogen (mol/L) | fluoride (F) (mol/L) | time (sec) | temperature (° C.) | hydrogen peroxide (mol/L) | fluoride (F) (mol/L) | time (sec) | temperature (° C.) | sulfuric acid (mol/L) | nitrogen (mol/L) | time (sec) | temperature (° C.) | time (sec) | temperature (° C.) |
|---|---|---|---|---|---|---|---|---|---|---|---|---|---|---|---|
| Comparative Example 1 | — | — | — | — | — | — | — | — | — | — | — | — | — | — | — |
| Comparative Example 2 | — | — | — | — | — | — | — | — | — | — | — | — | — | — | — |
| Comparative Example 3 | 4.7 | 1.1 | 2.1 | 60 | 30 | — | — | — | — | — | — | | — | — | — |
| Comparative Example 4 | 4.7 | 1.1 | 2.1 | 60 | 30 | 3.4 | 2.1 | 60 | 30 | — | — | | — | — | — |
| Comparative Example 5 | 4.7 | 1.1 | 2.1 | 60 | 60 | 3.4 | 2.1 | 60 | 30 | — | — | | — | — | — |
| Comparative Example 6 | 2.5 | — | 4.1 | 60 | 60 | 3.4 | 2.1 | 60 | 60 | — | — | | — | — | — |
| Comparative Example 7 | 2.5 | — | 4.1 | 60 | 60 | 3.4 | 2.1 | 60 | 60 | 0.5 | 10.4 | 100 | 60 | — | — |
| Comparative Example 8 | 4.7 | 1.1 | 2.1 | 150 | 60 | 3.4 | 2.1 | 60 | 60 | 0.5 | 11.4 | 100 | 60 | — | — |
| Comparative Example 9 | 6.2 | 1.1 | 2.1 | 150 | 60 | 3.4 | 2.1 | 60 | 60 | 0.5 | 11.4 | 100 | 60 | — | — |
| Embodiment 1 | 4.7 | 1.1 | 2.1 | 60 | 60 | 3.4 | 2.1 | 60 | 60 | 0.5 | 11.4 | 100 | 60 | — | — |
| Embodiment 2 | 4.7 | 1.1 | 2.1 | 60 | 60 | 3.4 | 2.1 | 60 | 60 | 0.5 | 11.4 | 100 | 60 | 600 | 100 |
| Embodiment 3 | 4.7 | 1.1 | 2.1 | 60 | 60 | 3.4 | 2.1 | 60 | 60 | 0.5 | 11.4 | 100 | 60 | 120 | 200 |
| Embodiment 4 | 4.7 | 1.1 | 2.1 | 60 | 60 | 3.4 | 2.1 | 60 | 60 | 0.5 | 11.4 | 100 | 60 | 300 | 200 |
| Embodiment 5 | 6.2 | 1.1 | 2.1 | 60 | 60 | 3.4 | 2.1 | 60 | 60 | 0.5 | 11.4 | 100 | 60 | — | — |
| Embodiment 6 | 6.2 | 1.1 | 2.1 | 60 | 60 | 3.4 | 2.1 | 60 | 60 | 0.5 | 11.4 | 100 | 60 | 120 | 200 |

TABLE 2

| Category | Surface Cleanliness | Pitting Stability | Contact Resistance (mΩ · cm²) | Corrosion Current (μA/cm²) | Contact Angle (°) | Thickness Reduction (μm) |
|---|---|---|---|---|---|---|
| Comparative Example 1 | o | o | 400 | 7 | 82 | — |
| Comparative Example 2 | o | o | 15 | 1 | 76 | — |
| Comparative Example 3 | x | o | 250 | 25 | 125 | — |
| Comparative Example 4 | x | o | 35 | 30 | 80 | — |
| Comparative Example 5 | x | o | 25 | 19 | 118 | — |
| Comparative Example 6 | o | x | 23 | 17 | 75 | — |
| Comparative Example 7 | o | x | 24 | 10 | 75 | — |

TABLE 2-continued

| Category | Surface Cleanliness | Pitting Stability | Contact Resistance (mΩ · cm²) | Corrosion Current (μA/cm²) | Contact Angle (°) | Thickness Reduction (μm) |
|---|---|---|---|---|---|---|
| Comparative Example 8 | ○ | ○ | 10 | 16 | 30 | 5 |
| Comparative Example 9 | ○ | ○ | 13 | 12 | 23 | 10 |
| Embodiment 1 | ○ | ○ | 10 | 14 | 19 | — |
| Embodiment 2 | ○ | ○ | 12 | 10 | 32 | — |
| Embodiment 3 | ○ | ○ | 12 | 5 | 50 | — |
| Embodiment 4 | ○ | ○ | 13 | 1 | 55 | — |
| Embodiment 5 | ○ | ○ | 13 | 12 | 23 | — |
| Embodiment 6 | ○ | ○ | 19 | 5 | 57 | — |

As shown in Tables 1 and 2 and FIGS. 2 through 7, the samples according to Embodiments 1 through 6 obtain clean surfaces without foreign substances thereon, obtain stable surfaces without pitting occurring thereon, and obtain stable surfaces without erosion occurring thereon (without thickness change).

Moreover, the samples according to Embodiments 1 through 6 obtain an interfacial contact resistance of 20 mΩ·cm² or less under a pressure of 1.0 MPa and show a corrosion current of 15 μA (SCE) or less at a voltage of 0.6V in a solution, heated to 60° C., of 0.1 N of sulfuric acid and 2 ppm of hydrofluoric acid, simulating a harsh operating environment of the polymer fuel cell.

On the other hand, in the case of the sample according to Comparative Example 3, pitting and erosion are not observed, but the sample has the non-uniform etching surface and the corrosion product remaining on the surface, having a bad effect on contact resistance, corrosion current, and contact angle. As shown in FIG. 5, on the sample according to Comparative Example 3, the corrosion product remains.

In the case of the sample according to Comparative Example 4, desmut processing for removing the corrosion product generated in the sample according to Comparative Example 3 is performed to improve a contact resistance, but residual foreign substances are not completely removed from the surface.

In the case of the sample according to Comparative Example 5, as a result of etching processing at a temperature of 60° C., a lot of corrosion product is generated on the surface in comparison to in the sample according to Comparative Example 4, and the residual foreign substances are not completely removed from the surface in spite of desmut processing.

For the sample according to Comparative Example 6, pitting occurs on the surface when nitric acid is not added to a complex mixed solution. It is observed that when the nitric acid is added, occurrence of pitting is lowered by induction of a full reaction.

For the sample according to Comparative Example 7, corrosion resistance is slightly improved by surface stabilization. It is observed that exposure to a nitric acid solution of a high concentration leads to improvement of surface passivation performance.

For the samples according to Comparative Example 8 and Comparative Example 9, exposure to an etching solution for a long time results in an excessive amount of a corrosion product and thus reduction in the thickness of a material surface on both sides. As the thickness of the material decreases, the engaging pressure of the 1000 stacked separators or more is lowered, degrading fuel cell performance, and desired surface characteristics are not obtained due to excessive etching.

As in Embodiment 1 and Embodiment 2, according to the method proposed in the present disclosure, stainless steel for a fuel cell separator may be manufactured through wet surface modification, which satisfies interfacial contact resistance, corrosion resistance, and contact angle characteristics required in the polymer fuel cell, and it is observed that corrosion resistance is improved through further thermal processing.

However, in Embodiment 2, due to an inefficient processing time in a continuous manufacturing process, a processing time needs to be improved.

In Embodiment 3 and Embodiment 4, a processing temperature is increased when compared to in Embodiment 2, thereby innovatively reducing a processing time.

However, when the temperature is 300° C. or higher, an excessive oxide layer is formed on the surface, degrading contact resistance characteristics, such that the temperature needs to be controlled below 300° C.

Comparing Embodiment 3 with Embodiment 6, it is observed that an interfacial contact resistance increases after thermal processing when the concentration of sulfuric acid is high in the etching process. It is determined that when the surface unstable due to the excessive amount of etching in the case of exposure to the high sulfuric acid concentration is subject to thermal processing, an oxide layer is generated a lot, increasing contact resistance.

Meanwhile, as shown in FIG. 8, by comparing Comparative Example 1 with Embodiment 1, it is observed that a content of oxygen is reduced by about 15% and a content of chromium is increased by about 15% in a surface top layer after wet surface processing. It is seen from this that as the oxide layer of the surface is removed and the natural oxide film is re-generated in etching processing, a content of a chromium oxide on the surface is increased.

Moreover, by comparing Embodiment 1 with Embodiment 3, it is seen that a content of Cr is reduced by about 15% after wet surface processing, and it is thought that iron is oxidized in thermal processing and thus a composition ratio on the surface is increased. In this way, it is determined that in a process of removing and reconstructing an oxide layer, which is a factor hindering an interfacial contact resistance, from the surface, using the method proposed in the present disclosure, the surface is modified, thus improving a contact resistance.

In the foregoing test, in a method of modifying the surface of the stainless steel having a composition range according to the present disclosure, for etching processing in a complex mixed solution of sulfuric acid, nitric acid, and fluoride, desmut processing in a mixed solution of hydrogen peroxide and fluoride, and surface stabilization processing in a mixed solution of sulfuric acid and nitric acid, conditions such as a temperature, composition, etc., of the solution serve as an important factor for implementation of interfacial contact resistance, corrosion resistance, and contact angle characteristics.

Thus, by modifying the passivation film of the stainless base material, low contact resistance, low corrosion current, and low contact angle may be secured, and by modifying a passivation layer through control of a composition ratio of Cr, Fe, and O elements, stainless steel proper for the polymer fuel cell separator may be produced.

Meanwhile, as shown in FIG. 9, performance evaluation results are shown with respect to unit cells using stainless steel according to the related art (Comparative Example 2) and Embodiment 3 and Embodiment 6 according to the present disclosure.

As can be seen from the stack evaluation results of FIG. 9, there is little difference in performance between unit cells using the sample according to Comparative Example 2 (the related art) in which Ag is coated on the stainless base material to a thickness of 1 μm and the samples according to Embodiment 3 and Embodiment 6 of the present disclosure.

While the embodiments of the present disclosure have been mainly described so far, various changes or modifications can be made at the level of those of ordinary skill in the art. Such changes and modifications can be understood as falling within the present disclosure without departing from the technical spirit of the present disclosure. Accordingly, the scope of the present disclosure should be determined by the appended claims.

EXPLANATION OF NUMERAL REFERENCES

S101: Stainless Base Material Providing Operation
S120: Degreasing Processing Operation
S130: Etching and Desmut Processing Operation
S140: Surface Stabilization Processing Operation
S150: Stabilization Thermal Processing Operation
The invention claimed is:

1. A method of manufacturing stainless steel for a polymer fuel cell separator, the method comprising:

providing a stainless base material comprising, by weight %, C: 0.01 to 0.08%, Si: 0.3 to 1.0%, Mn: 0.3 to 2.0%, Cr: 15 to 35%, Cu: 1.0% or less, N: 0.01 to 0.05%, Ti: 0.3% or less, Nb: 0.3% or less, and as the rest, Fe and inevitable impurities, the stainless base material having a passivation film formed on a surface thereof;

performing degreasing processing by immersing the surface of the stainless base material in a degreasing solution, wherein the degreasing solution contains 0.1 to 3 mol/L of sodium hydroxide, 0.01 to 2 mol/L of silicate, 0.005 to 0.8 mol/L of phosphate, and 0.02 to 3 mol/L of carbonate, along with a surfactant and an emulsifier;

after etching the degreasing-processed stainless base material with an etching solution, performing desmut processing with a desmut solution; and performing surface stabilization on the etched and desmut-processed stainless base material with a surface stabilization solution, wherein the degreasing processing includes performing immersion processing in the degreasing solution at 30 to 70° C. for 0.5 to 5 minutes, and wherein after the degreasing processing, the etching, and the surface stabilization, the stainless steel comprises a surface modification layer having an interfacial contact resistance of 10 to 35 mΩ·cm², and containing 15% less oxygen and 15% more chromium than a comparable layer produced without undergoing the degreasing processing, the etching, and the surface stabilization.

2. The method of claim 1, wherein the stainless base material further comprises one or more kinds of P: 0.14 weight % or less, S: 0.03 weight % or less, H: 0.004 weight % or less, and O: 0.007 weight % or less.

3. The method of claim 1, wherein the etching processing comprises performing immersion for 0.2 to 2 minutes in an etching solution, heated to 40 to 80° C., comprising at least two or more of 2.5 to 6.2 mol/L of sulfate ions, 0.1 to 2.0 mol/L of nitrate ions, and 1.0 to 5.0 mol/L of fluoride, and the desmut processing comprises performing immersion for 0.5 to 2 minutes in a desmut solution, heated to 40 to 80° C., comprising 1.5 to 6.0 mol/L of hydrogen peroxide, 1.0 to 4.0 mol/L of fluoride, and 0.001 to 0.01 mol/L of a corrosion inhibitor.

4. The method of claim 1, further comprising, after performing the surface stabilization, performing stabilization thermal processing for stabilization of the surface-stabilized stainless base material.

5. The method of claim 4, wherein the stabilization thermal processing is performed at 150 to 250° C. for 1 to 10 minutes.

6. A method of manufacturing stainless steel for a polymer fuel cell separator, the method comprising:

providing a stainless base material comprising, by weight %, C: 0.01 to 0.08%, Si: 0.3 to 1.0%, Mn: 0.3 to 2.0%, Cr: 15 to 35%, Cu: 1.0% or less, N: 0.01 to 0.05%, Ti: 0.3% or less, Nb: 0.3% or less, and as the rest, Fe and inevitable impurities, the stainless base material having a passivation film formed on a surface thereof;

performing degreasing processing by immersing the surface of the stainless base material in a degreasing solution to remove an organic matter from the surface, wherein the degreasing solution contains 0.1 to 3 mol/L of potassium hydroxide, 0.01 to 2 mol/L of silicate, 0.005 to 0.8 mol/L of phosphate, and 0.02 to 3 mol/L of carbonate, along with a surfactant and an emulsifier;

after etching the degreasing-processed stainless base material with an etching solution, performing desmut processing with a desmut solution; and performing surface stabilization on the etched and desmut-processed stainless base material with a surface stabilization solution that includes nitrate of 2.7 to 13.8 mol/L, sulfate of 0.05 to 0.5 mol/L, and surfactant, wherein the degreasing processing includes performing immersion processing in the degreasing solution at 30 to 70° C. for 0.5 to 5 minutes, and wherein after the degreasing processing, the etching, and the surface stabilization, the stainless steel comprises a surface modification layer having an interfacial contact resistance of 10 to 35 mΩ·cm², and containing 15% less oxygen and 15% more chromium than a comparable layer produced without undergoing the degreasing processing, the etching, and the surface stabilization.

* * * * *